UNITED STATES PATENT OFFICE.

CHARLES P. KEEN, OF LEESBURG, OHIO, ASSIGNOR TO REBECCA J. KEEN, OF SAME PLACE.

LINIMENT.

SPECIFICATION forming part of Letters Patent No. 327,833, dated October 6, 1885.

Application filed July 1, 1885. Serial No. 170,378. (No specimens.)

*To all whom it may concern:*

Be it known that I, CHARLES P. KEEN, a citizen of the United States, residing at Leesburg, in the county of Highland and State of Ohio, have invented a new and useful Liniment, of which the following is a specification.

My invention has relation to liniments for the relief of pain and the arrest of disease in cases of rheumatism, neuralgia, headache, sore throat, scalds, sprains, cuts, bruises, and all similar complaints; and it consists in the combination of the ingredients hereinafter described and claimed.

My improved liniment consists of the following-named ingredients substantially in the proportions stated, viz: Fusel-oil, one gallon; gum-camphor, one ounce; oil of cinnamon, two ounces; spirits turpentine, four ounces; alcohol, one pint; sulphuric ether, one ounce; oil of winter-green, two ounces; curcuma-powder in alcohol, one-half ounce, to be mixed and compounded as follows: Dissolve the gum-camphor in the alcohol and then add the oil of cinnamon and oil of winter-green and allow the mixture to stand about four hours. Then add the turpentine and shake well, and again let the mixture stand one hour, after which pour it into the gallon of fusel-oil and add the sulphuric ether. I put one-half pound of curcuma-powder in one pint of alcohol and let it stand twenty-four hours. Then I rack it off and put one-half ounce of the liquid into the mixture, as stated above, and the whole mass, after being well shaken, is allowed four hours, when the liniment is ready for use, and will be found to be a pleasant and efficient remedy for the removal of pain.

I am aware it is not broadly new to make a liniment comprising the combination of fusel-oil, tincture of arnica, tincture of aconite, gum-camphor, and oil of sassafras, and such ingredients I do not claim as my invention.

Having thus explained my invention, what I claim as new, and desire to secure by Letters Patent, is—

A liniment composed of fusel-oil, alcohol, gum-camphor, sulphuric ether, oil of cinnamon, oil of winter-green, spirits of turpentine, and curcuma in the proportions set forth.

CHARLES P. KEEN.

Witnesses:
 TAYLOR EVANS,
 FRANK KING.